United States Patent [19]

Eberle et al.

[11] Patent Number: 4,725,192
[45] Date of Patent: Feb. 16, 1988

[54] INDUSTRIAL ROBOT ASSEMBLY

[75] Inventors: Manfred Eberle, Erlangen; Rainer Keppler, Baiersdorf; Bernd Köslich, Herzogenaurach-Niederndorf, all of Fed. Rep. of Germany

[73] Assignee: Manutec Gesellschaft für Automatisierung- und Handhabungssysteme GmbH, Fürth, Fed. Rep. of Germany

[21] Appl. No.: 852,333

[22] Filed: Apr. 15, 1986

[30] Foreign Application Priority Data

Apr. 16, 1985 [DE] Fed. Rep. of Germany ....... 3513638

[51] Int. Cl.$^4$ ............................................. B25J 9/06
[52] U.S. Cl. ................... 414/744 A; 901/15; 901/21; 901/23; 901/25
[58] Field of Search ............... 414/744 R, 744 A, 735; 901/21, 23, 24, 25, 15, 17

[56] References Cited

U.S. PATENT DOCUMENTS

| | | | |
|---|---|---|---|
| 3,240,358 | 3/1966 | Ferguson | 414/744 A X |
| 4,348,142 | 9/1982 | Figour | 414/2 |
| 4,518,298 | 5/1985 | Yasukawa | 901/23 X |
| 4,568,238 | 2/1986 | Hirano et al. | 901/14 X |
| 4,610,598 | 9/1986 | Hamada et al. | 901/15 X |

FOREIGN PATENT DOCUMENTS 1148721 5/1963 Fed. Rep. of Germany .

Primary Examiner—Robert J. Spar
Assistant Examiner—Donald W. Underwood
Attorney, Agent, or Firm—Kenyon & Kenyon

[57] ABSTRACT

An industrial robot assembly comprises a support body including a stationary portion and a vertically translatable portion. A tapered arm member is mounted to the translatable portion of the support for rotation about a first vertically oriented axis, and an angle lever is mounted to the tapered arm member at a point spaced from the first axis for rotation about a second axis parallel to and spaced from the first axis. A first electric motor is operatively connected to the arm member for rotating that member about the first axis, while a second electric motor is operatively connected to the angle lever for rotating that lever about the second axis. A translatable and rotatable component for carrying grippers or another workpiece manipulating element is mounted to the angle lever at a point spaced from the second axis. A third electric motor and a lifting drive are operatively coupled to the holder component for translating the component and for rotating that component about a third axis, respectively. The electric motors are all mounted to the arm member, the lifting device being mounted to the angle lever.

8 Claims, 5 Drawing Figures

INDUSTRIAL ROBOT ASSEMBLY

BACKGROUND OF THE INVENTION

This invention relates to an industrial robot assembly. More particularly, this invention relates to a robot assembly having a pair of relatively rotatable arm members and a holder component which is both translatable and rotatable about an axis.

Such an industrial robot assembly is disclosed in U.S. Pat. No. 4,348,142 and specifically in FIG. 1 thereof.

Many conventional robot assemblies use individual electrical drives, as disclosed in German Patent Document (Auslegeschrift) No. 11 48 721. If the individual drives are disposed at the respective axes of rotation, highly precise movements are obtainable. However, the disposition of drive units at the free end of a robot arm renders it difficult to perform many fine movements at high speeds.

An object of the present invention is to provide an improved robot assembly of the above-described type.

Another, more particular, object of the present invention is to provide such a robot assembly which is capable of performing many precise movements at high speeds.

SUMMARY OF THE INVENTION

An industrial robot assembly comprises, in accordance with the present invention, a support, a first arm member mounted to the support for rotation about a first axis, and a second arm member mounted to the first arm member at a point spaced from the first axis for rotation about a second axis parallel to and spaced from the first axis. A first drive is operatively connected to the first arm member for rotating that member about the first axis. A second drive is operatively connected to the second arm member for rotating the second member about the second axis. A holder is mounted to the second arm member at a point spaced from the second axis for carrying means for operating on a workpiece, the holder including a translatable component rotatable about a third axis. A third drive and a fourth drive are operatively coupled to the holder component for translating the component and for rotating it about a third axis, respectively, the third drive and the fourth drive each being mounted to one of the arm members.

In accordance with particular features of the present invention, the third drive includes a source of rotary power coupled to the holder component via a pivotably mounted lever, while the fourth drive includes an electric motor having an axis of rotor rotation oriented parallel to the first axis and the second axis. In addition, the fourth drive preferably includes a serrated power transmission belt coupled to the electric motor and to the holder component.

Pursuant to further particular features of the present invention, the holder component is translatable by the third drive in a direction parallel to the third axis and the third axis is oriented parallel to the first axis and the second axis. In a preferred embodiment of the invention, the rotation axes are vertically oriented.

Preferably, the first axis is located at one end of the first arm member and the second axis is located at an opposite end of the first arm member. In addition, the second arm member is mounted to the first arm member at the second axis and the holder is mounted to the second arm member at an end thereof spaced from the second axis. In a preferred embodiment of the invention, the first axis and the second axis are vertical axes.

In accordance with yet a further particular feature of the present invention, the holder component takes at least in part the form of a cylinder, whereby pneumatic or other connecting lines for gripper elements disposed on the holder component may be guided centrically through the cylinder.

DETAILED DESCRIPTION

Figure 1:
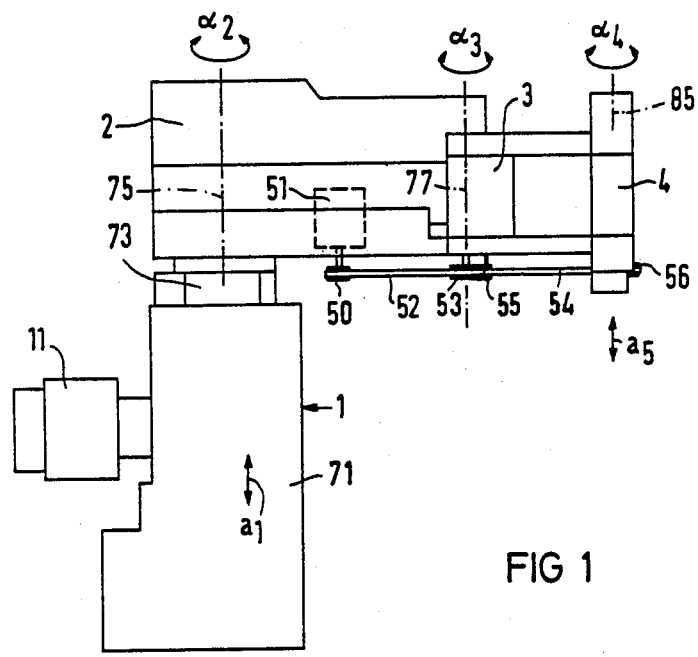
FIG. 1 is a schematic side elevational view of an industrial robot assembly in accordance with the present invention, showing a pair of relatively rotatable arm members coupled to one another at a rotary joint and further showing a holder component at a free end of one of the arm members.

As illustrated in FIG. 1, an industrial robot assembly comprises a support body 1 having a stationary portion 71 and a vertically translatable lifting portion 73. A motor 11 fixed to stationary portion 71 is operatively connected to lifting portion 73 for shifting the same alternately upwardly and downwardly, as indicated by an arrow $a_1$. A first arm member 2 is rotatably mounted to lifting member 73 for limited pivotal motion through an angle $a_2$ about a first vertically oriented rotation axis 75. This pivoting or swinging motion of arm 2 about axis 75 is implemented by an electric motor 21 (see FIGS. 2 and 4) mounted to arm 2.

Another arm member 3 is rotatably mounted to an end of arm member 2 opposite rotation axis 75. Arm member 3 is limitedly pivotable through an angle $a_3$ about another vertically oriented rotation axis 77. The pivoting of arm 3 about axis 77 is accomplished by an electric motor 31 (see FIGS. 2 and 4) mounted to arm 2.

Figure 2:
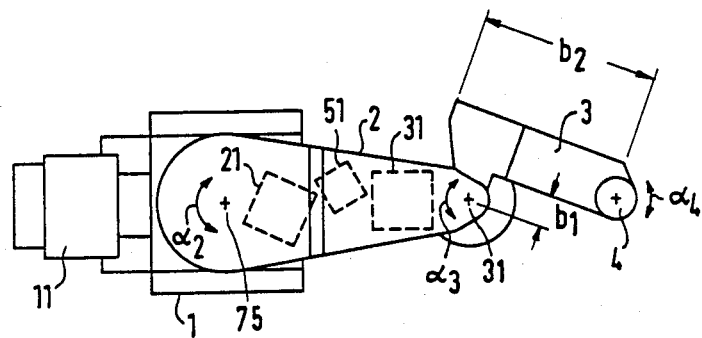
FIG. 2 is a schematic top view of the robot assembly illustrated in FIG. 1.
Figure 3:
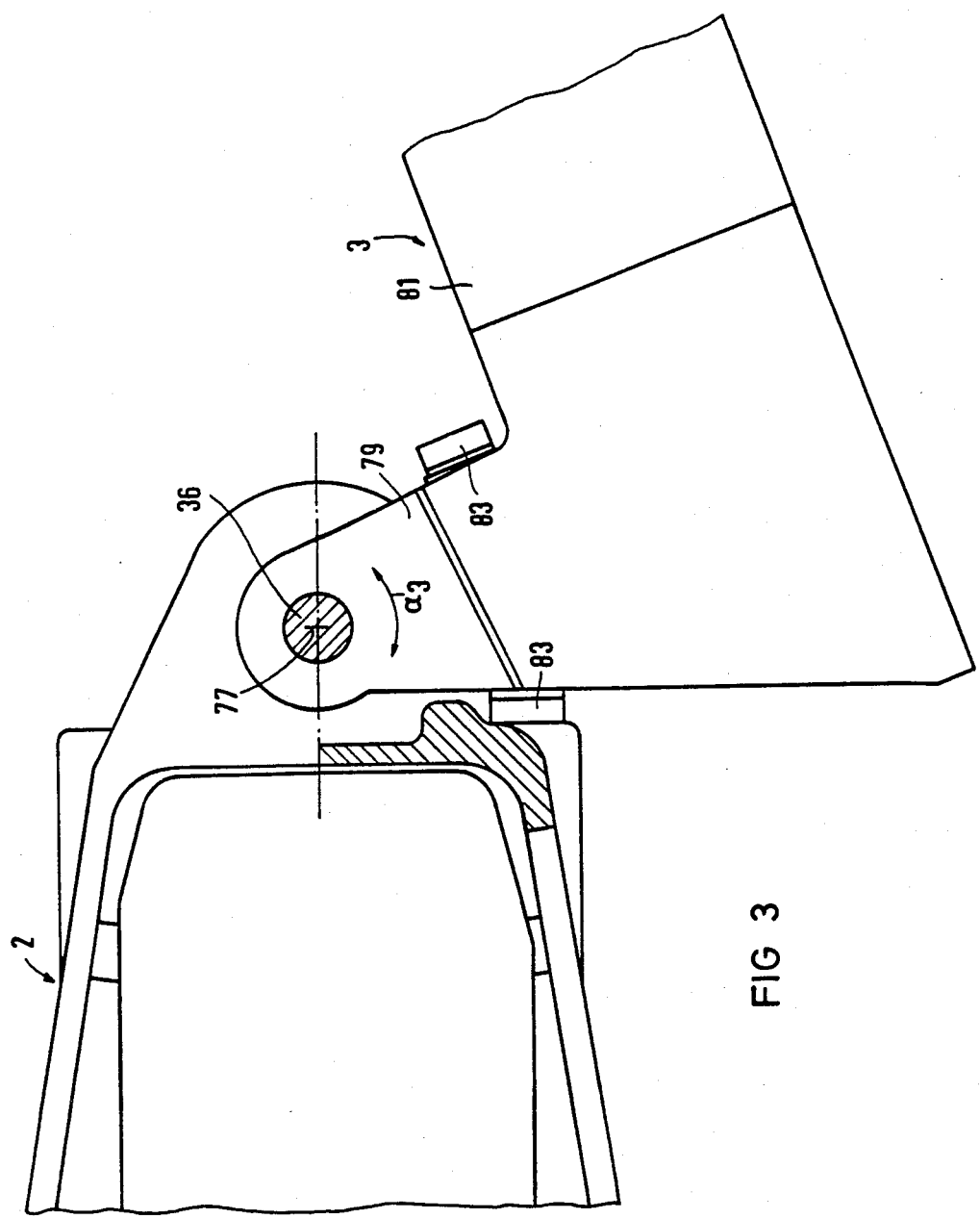
FIG. 3 is a partial schematic top view of the arm members of FIG. 1, partially in cross section and on an enlarged scale.

As illustrated in FIGS. 2 and 3, arm member 3 takes the form of an angle lever having a short portion 79 disposed at an angle of preferably 90° with respect to a long portion 81 of the angle lever. Short portion 79 and long portion 81 of angle lever 3 have respective lengths $b_1$ and $b_2$, these lengths advantageously having a ratio between 1:3 and 1:8 and preferably approximately 1:6. A free end of short portion 79 of angle lever 3 is mounted in a fork-like extension 37 (see FIG. 4) of arm member 2 via a shaft 36 having rotation axis 77 as an axis of symmetry.

Owing to the angular design of angle lever 3 and a tapered or conical shape of arm member 2 (FIG. 2), it is possible to rotate the arm members 2 and 3 relative to one another so that long portion 81 (FIG. 3) is approximately parallel to arm member 2. The relative motion of arm members 2 and 3 is limited by buffer elements 83.

At a free end of long portion 81 of angle lever 3, i.e., at an end of angle lever 3 opposite axis 77 and short portion 79, is disposed a holder 4 for carrying grippers, a screwdriver or other element for performing an operation on a workpiece in an industrial process. Holder 4 has a component 43 (see FIG. 5) which is vertically reciprocatable, as indicated by an arrow $a_5$ in FIG. 1, and rotatable or pivotable through an angle $a_4$ about a rotation axis 85 oriented parallel to axes 75 and 77. Both arm members 2 and 3 and actuator 4 are vertically movable by lifting portion 73 of pedestal-like support body 1.

Figure 4:
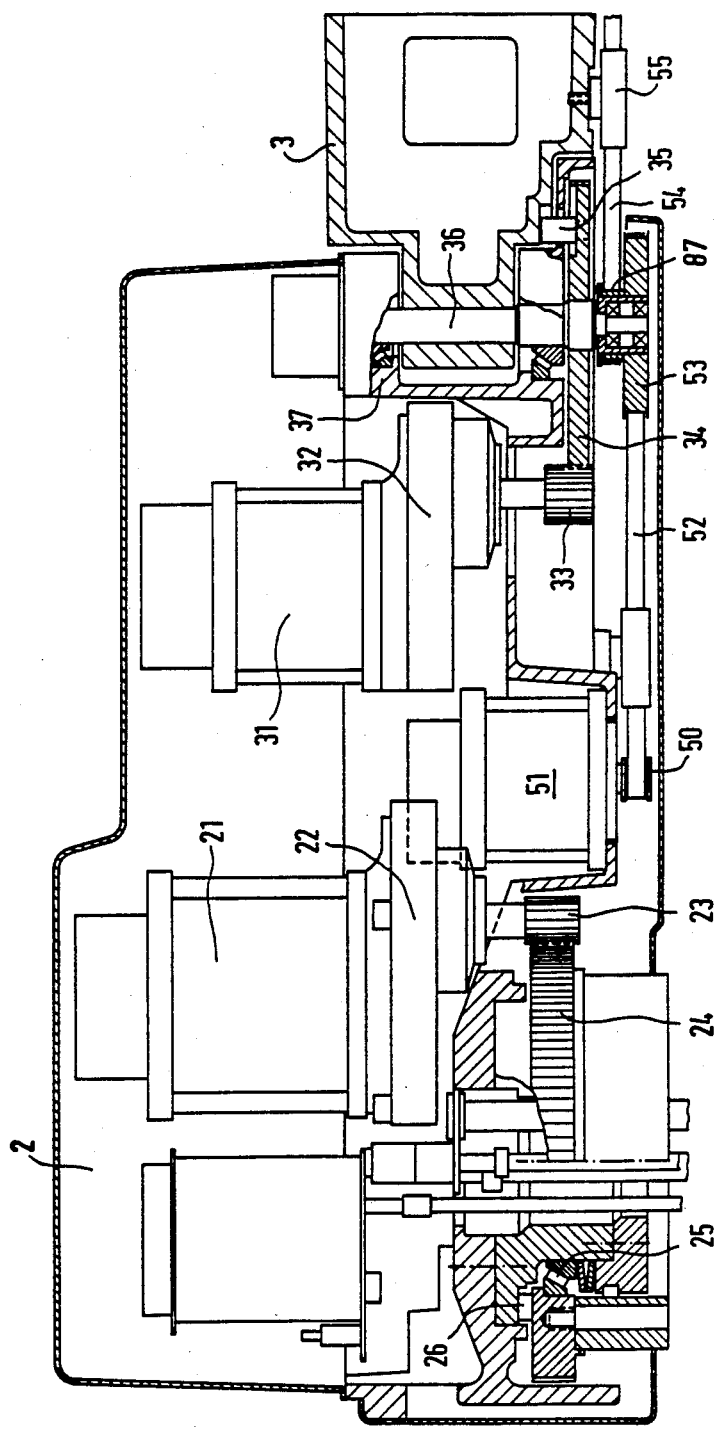
FIG. 4 is a longitudinal, partially schematic, cross-sectional view through one of the arm members and through a portion of the other arm member.

As shown in FIG. 4, arm member 2, as well as angle lever 3 and holder 4, is rotatably supported on lifting portion 73 (not illustrated in FIG. 4) by means of a conical roller bearing 25 and a needle bearing 26. To lifting portion 73 is fixed a gear 24 which meshes with a pinion 23 driven by electric motor 21 via a transmission 22. Motor 21, transmission 22, pinion 23 and gear 24 collectively serve as a drive for rotating arm member 2 (and angle lever 3 and actuator 4) about axis 75.

Motor 31 rotatably drives a pinion 33 via a transmission 32, pinion 33 meshing with a gear 34 mounted to arm member 2 for rotation about axis 77. Rotary motion of gear 34 is converted into a pivoting motion of angle lever 3 via at least one driver dog 35 exemplarily fixed to angle lever 3 and slidably engaging walls of a slot in gear 34.

Motors 21 and 31, as well as a third electric motor 51 mounted to arm member 2, each have a vertically extending axis of rotor rotation. As illustrated in FIGS. 1 and 4, a serrated endless belt 52 couples a pulley 50 at the output of drive motor 51 with another pulley 53 which is mounted on a bottom side of arm member 2 for rotation about axis 77. Another pulley 87 fixed to pulley 53 is coupled via another serrated endless belt 54 to a driven pulley 56 at holder 4. The direction of extension of belt 54 is conformed to the shape of angle lever 3 by means of an idler pulley 55 mounted to lever 3.

The disposition of the drive motors, particularly motors 31 and 51, within or on arm member 2 and relatively close to axis 75 serves to provide a reduced moment of inertia. This configuration of the drive motors also enables a reduction in the size of arm members such as angle lever 3 connected at the free end of the first arm member 2, thereby reducing the space required for the robot assembly and facilitating automatic operations under crowded conditions.

Figure 5:
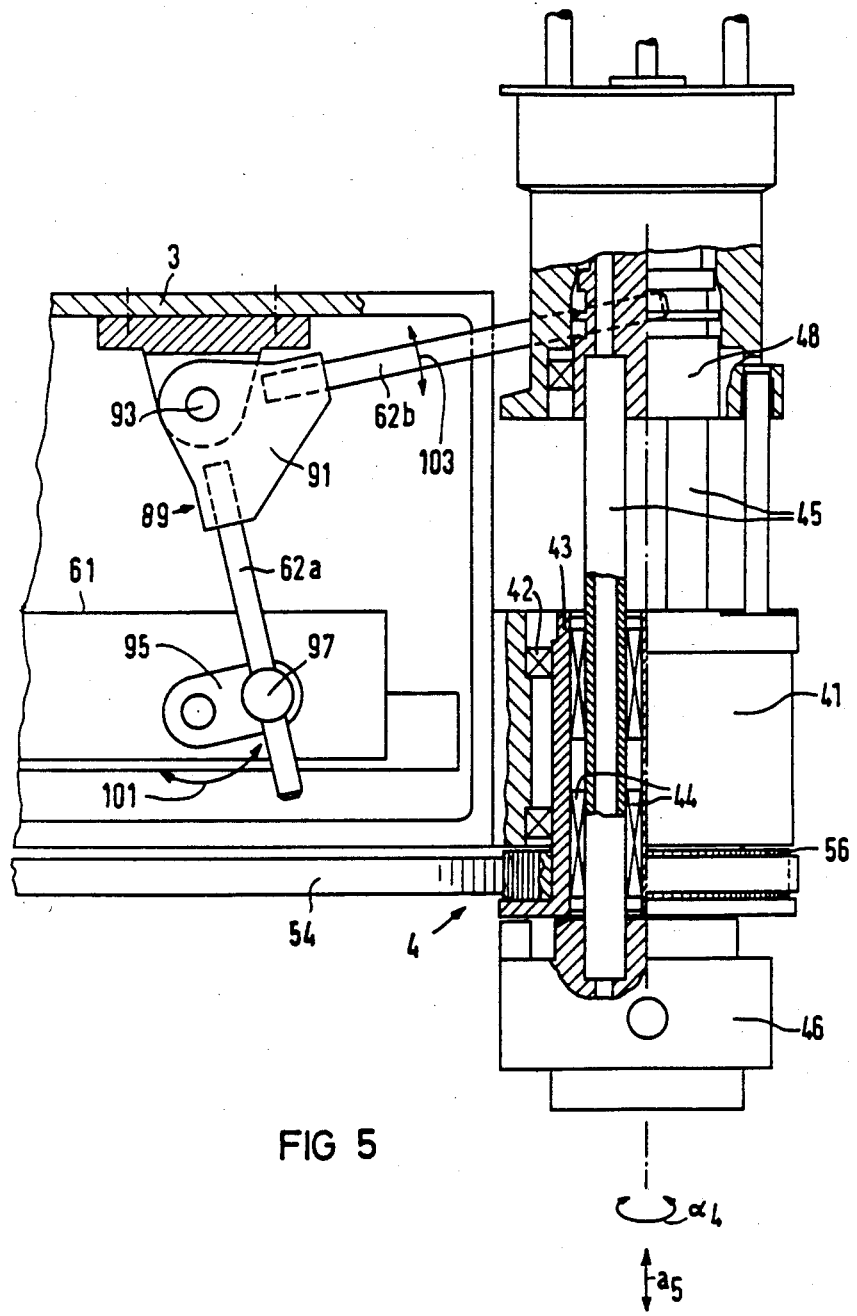
FIG. 5 is a partially schematic cross-sectional view of the holder component and a portion of one of the arm members of FIG. 1.

As illustrated in FIG. 5, holder member 4 comprises a carrier 41 to which a lifting part 48 is shiftably mounted via ball sleeves 44 for alternating upward and downward motion, as indicated by arrow $a_5$. Lifting part 48 includes guide tubes 45 and an end plate 46. Component 43 and 48 are rotatably mounted to carrier 41 by means of bearings 42.

Rotatable component 43 is pivoted about axis 85 (FIG. 1) by rotary power transmitted from motor 51 via serrated belts 52 and 54. As shown in FIG. 5, serrated belt 54 engages pulley 56 about a portion of the circumference thereof, that pulley being rigidly connected to component 43 so that rotation of pulley 56 results in rotation of component 43.

Translation of part 48 is accomplished via a lever system 89 comprising a pair of lever arms 62a and 62b oriented at approximately 90° with respect to one another, each lever arm being fixed at one end to a bracket 91 rotatably and flexibly mounted to arm member 3 for rotation about a horizontal axis 93. Motion of lever system 89 about axis 93 is accomplished by a rotary pneumatic drive 61 having a pivotable output lever 95 coupled to lever arm 62a at a sliding joint 97. Rotary motion of output lever 95, as indicated by an arrow 101, results in rotary motion of lever system 89, as indicated by an arrow 103, and in a vertical shifting motion of lifting part 48 and rotatable component 43 attached thereto, as indicated by arrow $a_5$. In order to convert the rotary motion of lever system 89 into translation of lifting part 48, an end of lever arm opposite bracket 91 is slidably inserted in an eye or aperture in the lifting part.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to understood that the descriptions and illustrations herein are preferred by way example to facilitate comprehension of the invention and should not be construed to limit the scope thereof.

What is claimed is:

1. An industrial robot assembly comprising:
    a support;
    a first arm member mounted to said support for rotation about a first axis;
    first drive means operatively connected to said first arm member for rotating same about said first axis;
    a second arm member mounted to said first arm member at a point spaced from said first axis for rotation about a second axis parallel to and spaced from said first axis;
    second drive means operatively connected to said second arm member for rotating same about said second axis;
    holder means mounted to said second arm member at a point spaced from said second axis for carrying means for operating on a workpiece, said holder means including a translatable component rotatable about a third axis;
    third drive means operatively coupled to said component for translating same, said third drive means being mounted to one of said first arm member and said second arm member, said third drive means including a source of rotary power coupled to said component directly via a pivotably mounted lever, said component being translatable by said third drive means in a direction parallel to said third axis; and
    fourth drive means operatively coupled to said component for rotating same about said third axis, said fourth drive means including an electric motor having an axis of rotor rotation oriented parallel to said first axis and said second axis, said electric motor being mounted to said first arm member, said fourth drive means further including a serrated power transmission belt coupled to said electric motor and to said component.

2. The robot assembly defined in claim 1 wherein said third axis is oriented parallel to said first axis and said second axis.

3. The robot assembly defined in claim 2 wherein said first axis is vertically oriented.

4. The robot assembly defined in claim 3 wherein said first are member has a first end spaced from said first axis and said second arm member has a second end spaced from said second axis, said second arm member being mounted to said first arm member at said first end, said holder means being mounted to said second arm member at said second end.

5. The robot assembly defined in claim 4 wherein said first axis is located at an end of said first arm member opposite said first end, said second axis being located at said first end.

6. The robot assembly defined in claim 1 wherein said first axis is vertically oriented.

7. The robot assembly defined in claim 1 wherein said first arm member has a first end spaced from said first axis and said second arm member has a second end spaced from said second axis, said second arm member being mounted to said first arm member at said first end, said actuator means being mounted to said second arm member at said second end.

8. The robot assembly defined in claim 7 wherein said first axis is located at an end of said first arm member opposite said first end, said second axis being located at said first end.

* * * * *